United States Patent
Liu et al.

(10) Patent No.: US 12,106,446 B2
(45) Date of Patent: Oct. 1, 2024

(54) SYSTEM AND METHOD OF IMAGE STITCHING USING ROBUST CAMERA POSE ESTIMATION

(71) Applicant: Mitsubishi Electric Research Laboratories, Inc., Cambridge, MA (US)

(72) Inventors: Dehong Liu, Lexington, MA (US); Laixi Shi, Pittsburgh, PA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 282 days.

(21) Appl. No.: 17/214,813

(22) Filed: Mar. 27, 2021

(65) Prior Publication Data

US 2022/0318948 A1  Oct. 6, 2022

(51) Int. Cl.
  *G06T 3/4038* (2024.01)
  *G06T 3/4007* (2024.01)
  *G06T 3/4084* (2024.01)
  *G06T 7/70* (2017.01)

(52) U.S. Cl.
  CPC .......... *G06T 3/4038* (2013.01); *G06T 3/4007* (2013.01); *G06T 3/4084* (2013.01); *G06T 7/70* (2017.01); *G06T 2207/30244* (2013.01)

(58) Field of Classification Search
  CPC ... G06T 3/4038; G06T 3/4007; G06T 3/4084; G06T 7/70; G06T 2207/30244
  See application file for complete search history.

(56) References Cited

U.S. PATENT DOCUMENTS

| | | | |
|---|---|---|---|
| 2016/0063706 A1* | 3/2016 | Gonzalez-Banos | G06T 7/73 348/222.1 |
| 2016/0163114 A1* | 6/2016 | Arrigoni | G06T 19/20 345/419 |
| 2017/0018086 A1* | 1/2017 | Zhang | G06T 7/73 |
| 2017/0103529 A1* | 4/2017 | Shi | H04N 19/426 |
| 2019/0073792 A1* | 3/2019 | Fletcher | G01C 11/00 |
| 2019/0253674 A1* | 8/2019 | Wei | G06T 7/73 |
| 2022/0051431 A1* | 2/2022 | Jagadeesan | G06V 10/98 |

* cited by examiner

*Primary Examiner* — Chan S Park
*Assistant Examiner* — Daniel C Chang
(74) *Attorney, Agent, or Firm* — Gene Vinokur; Hironori Tsukamoto (57) ABSTRACT

An image forming system for constructing a whole large image of an object is provided. The image forming system includes an interface configured to sequentially acquire images of partial areas of the object obtained by a camera, wherein two adjacent images of the partial areas include overlap portions, wherein the sequential images correspond to a three dimensional (3D) surface of the object, wherein the geometrical information (geometrical parameters) of the object is provided, wherein an initial pose of the camera is provided. The system further includes a memory to store computer-executable programs including a pose estimation method and a stitching method, and an image stitching processor configured to perform steps of estimating camera poses with respect to the sequential images by the robust camera pose estimation method which imposes low-rankness and joint sparsity of relative pose matrices, projecting the sequential images into a 3D surface based on the camera pose estimations, and constructing a two-dimensional (2D) image of the object by interpolating projected surface images; outputting the constructed 2D image via the interface.

16 Claims, 10 Drawing Sheets

Algorithm 1: Robust Camera Pose Estimation

Input: Constructed relative pose matrix estimation $\tilde{L}$ and mask $M$, and $A$.

Initialize $S^{(0)} = 0$, $P^{(0)} = 0$, parameters $\lambda$, $\epsilon$, and $iter$;

for $t \leftarrow 1$ to $iter$ do

$\quad$ *Update* $\quad P^{(t)} = A^\dagger \left( \tilde{L} - S^{(t-1)} \right)$

$\quad$ *Update* $\quad S_{i,j}^{(t)} = \left( \tilde{L} - AP^{(t)} \right)_{i,j} \odot \max\left( 0, 1 - \dfrac{\lambda}{\left\| \left( \tilde{L} - AP^{(t)} \right)_{i,j} \cdot W \right\|_2} \right)$ $\quad$ if $\left\| P^{(t)} - P^{(t-1)} \right\|_F \leq \epsilon$ then break;

end

Output: $\hat{P} \leftarrow P^{(t)}$.

|  | Pairwise | Bundle | LS | Proposed |
|---|---|---|---|---|
| Relative pose error | 0.948 | 0.968 | 0.140 | 0.037 |
| PSNR of $U$ (dB) | 19.23 | 20.94 | 26.68 | 30.29 |

Relative errors of the relative camera pose matrices and PSNRs of stitching results U using N = 50 images.

Fig. 7

Fig. 8C
$\hat{U}$ via Novel method

Fig. 8A
True image $U$

Fig. 8B
$\hat{U}$ via LS

Fig. 9A
Local area of Fig. 8A

Fig. 9B
Local area of Fig. 8B

Fig. 9C
Local area of Fig. 8C

SYSTEM AND METHOD OF IMAGE STITCHING USING ROBUST CAMERA POSE ESTIMATION

FIELD OF THE INVENTION

The present invention is related generally to an apparatus and a method for stitching images of a large scene or surface captured by a camera with unknown perturbed poses.

BACKGROUND & PRIOR ART

Image stitching techniques aim to fuse a collection of overlapped images to achieve a broad view of an object or a scene of interest with satisfactory resolution in applications such as Google earth mapping, video stabilization, panoramic image construction, drone image stitching, and 3D structure reconstruction, etc. In order to achieve high stitching precision required by various applications, it is necessary to compensate geometric distortions of collected images, in which camera pose estimation for each image is a crucial task, as even a tiny error in camera pose estimation may lead to obvious distortion and visual mismatch of the stitched image, and consequently restrict subsequent applications. Therefore, it is of great importance and daunting challenge to accurately estimate camera poses given collected images.

In recent decades, pairwise image alignment and stitching methods have been well studied as a generalized perspective-n-point (PnP) problem using matching feature points. In particular, for each pair of images to be stitched, SIFT-feature-based matching points of the image pair are utilized to estimate associated camera poses using a PnP method such that images can be stitched one by one. Pairwise image stitching methods generally work well for a small number of images with explicit matching points. However, when the total number of images is large, or feature points are not well matched, pairwise stitching methods may fail, since any false matching points may cause abnormal camera pose error, and this error will propagate to subsequent camera pose estimates used for stitching, finally deteriorate the image stitching performance. To solve this problem, global alignment approaches such as bundle adjustment have been explored to improve the robustness of stitching. The bundle adjustment method considers matching feature points between a target image and a bundle of its overlapping reference images, instead of just one reference image, to estimate the camera pose of the target image. Therefore, the overall robustness is improved due to the increase of matching points. However, the performance is still not quite satisfactory, especially for high precision stitching since those false matching points still inevitably cause camera pose errors. Accordingly, there is a need to develop novel system and method of image stitching using robust camera pose estimation for improving the performance.

SUMMARY OF THE INVENTION

In our proposed framework, we proposed a robust camera pose estimation method which can accurately estimate camera poses even with abnormal pairwise camera pose errors. In particular, given a collection of indexed images, we first construct relative camera pose matrices of all pairs of images. Each entry corresponds to a target and a reference image pair indexed by the row and the column, respectively. When the pair of images are overlapped to each other, the corresponding entry is achieved by solving a perspective-n-point (PnP) problem using matching feature points of the overlapped area, otherwise the entry is non-observable. For 6-degrees-of-freedom (6 DoF) camera poses, we construct 6 matrices, each matrix corresponding to one of the six degrees of freedom. As a global alignment approach, our proposed method aims to estimate camera poses based on the partially observed matrices of relative poses by exploiting the underlying rank-2 matrices of relative poses and the joint sparsity of camera pose errors in estimation. Numerical simulations demonstrate that our proposed method outperforms existing pairwise and global alignment baselines in stitching images.

Low-rankness and sparsity have been widely studied in recent years in exploiting the low-dimensional structure of signals, such as image restoration, signal processing, video processing, machine learning, and Euclidean distance matrix reconstruction. A well-known method to solve this type of problems is the robust principal component analysis (RPCA), which recovers a low-rank matrix and a sparse error matrix from their superposition observations. Inspired by the RPCA but differently, here we exploit the low-rankness in an implicit way rather than using an explicit low-rank constraint such as matrix nuclear norm. We also promote the joint sparsity of relative pose errors given partially observed matrices.

Accordingly, some embodiments of the present disclosure can provide contributions that can be summarized as follows:

1. This disclosure proposes a robust image stitching method which exploits the underlying rank-two matrices of relative poses and the joint sparsity of camera pose errors. The proposed method exhibits robust performance even under abnormal camera poses.

2. The disclosure implicitly describes the low-rankness and joint sparsity given partially observed matrices. The proposed method is potentially applicable to various scenarios targeting a sequence of linearly related estimations.

3. The disclosure provides numerical experiments using synthetic images captured by a camera with unknown perturbed poses. Our experiments demonstrated significant improvement in performance over other baseline methods.

Further, some embodiments of the present invention are based on recognition that an image forming system is provided for constructing a whole image of an object. The image forming system may include an interface configured to sequentially acquire images of partial area of the object, captured by a camera, wherein two adjacent images of the partial areas include overlap portions, wherein the sequential images correspond to a three dimensional (3D) surface of the object, wherein the geometrical information (geometrical parameters) of the object is provided, wherein an initial pose of the camera is provided; a memory to store computer-executable programs including a pose estimation method and a stitching method; and an image stitching processor configured to perform steps of: estimating poses with respect to the sequential images by the pose estimation method; projecting the sequential images into a 3D surface based on the camera pose estimations by solving a perspective-n-point (PnP); constructing a two-dimensional (2D) image of the object based on the estimated camera poses; and outputting the constructed 2D image via the interface.

Yet further, another embodiment may provide an image forming method for constructing a whole image of an object. In this case, the method comprises steps of: sequentially acquiring images of partial areas of the object captured by a camera via an interface, wherein two adjacent images of partial areas include overlap portions, wherein the sequential images correspond to a three dimensional (3D) surface of the object, wherein the geometrical information of the object is provided, wherein an initial pose of the camera is provided; providing computer-executable programs including a pose estimation method and a stitching method from a memory; and performing steps, using an image stitching processor: estimating poses with respect to the sequential images by the pose estimation method; projecting the sequential images into a 3D surface based on the camera pose estimations by solving a perspective-n-point (PnP); constructing a two-dimensional (2D) image of the object based on the estimated camera poses; and outputting the constructed 2D image via the interface.

BRIEF DESCRIPTION OF THE DRAWING

The accompanying drawings, which are included to provide a further understanding of the invention, illustrate embodiments of the invention and together with the description serve to explain the principle of the invention.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Figure 1A:
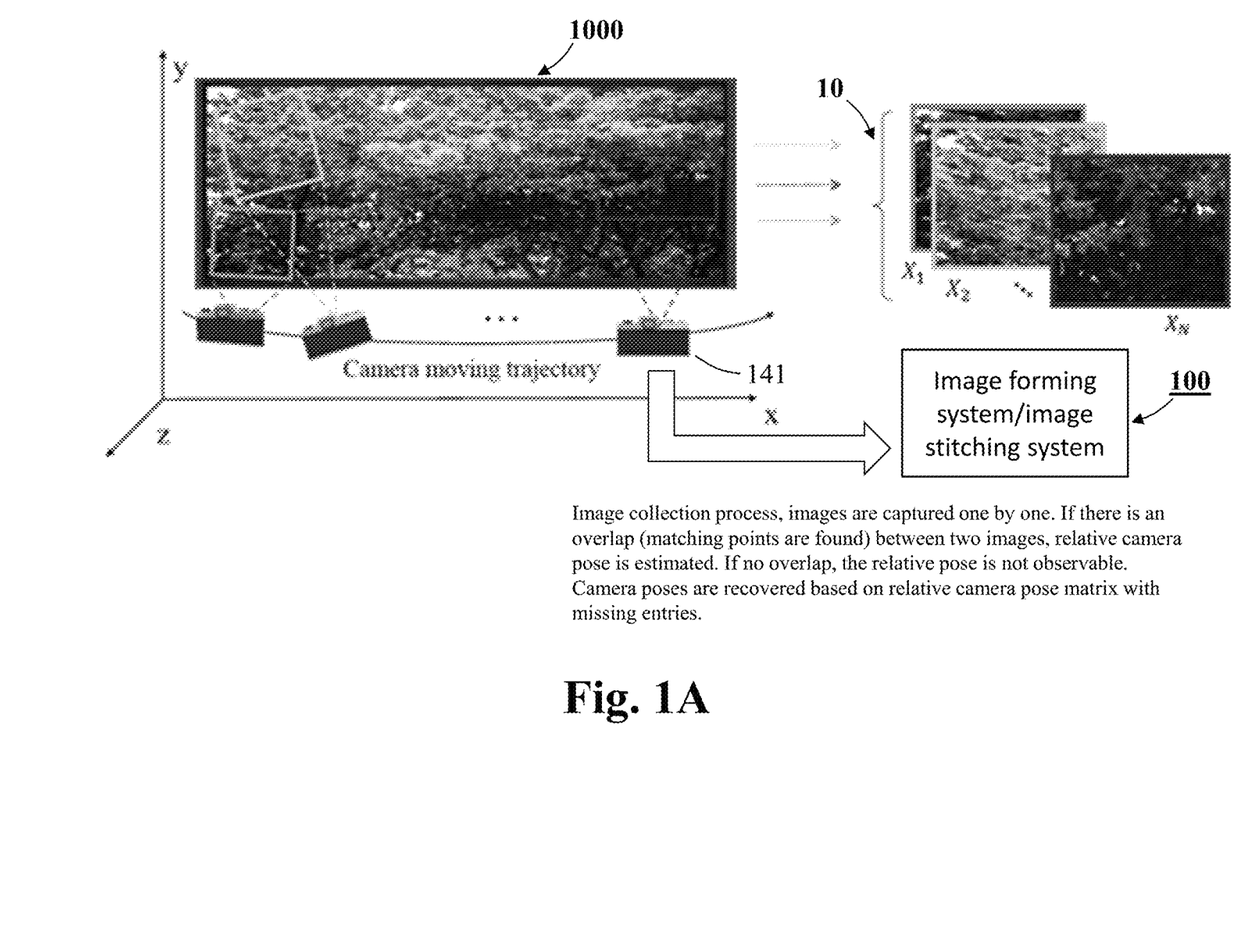
FIG. 1A shows an example illustrating image collection process, according to embodiments of the present invention.

FIG. 1A shows an example illustrating image collection process, according to embodiments of the present invention. In the image collection process, images are captured one by one. If there is an overlap between two images, a relative camera pose between the two corresponding camera poses is computed. If no overlap, the corresponding relative pose is set unknown (missing). The figure is an example illustrating image collection process, according to embodiments of the present invention. Each camera snapshot covers a small area of the large surface (painting) with unknown camera pose perturbance. The camera is moving in a snake-scan pattern to cover the whole surface with overlapped image snapshots.

Figure 1B:
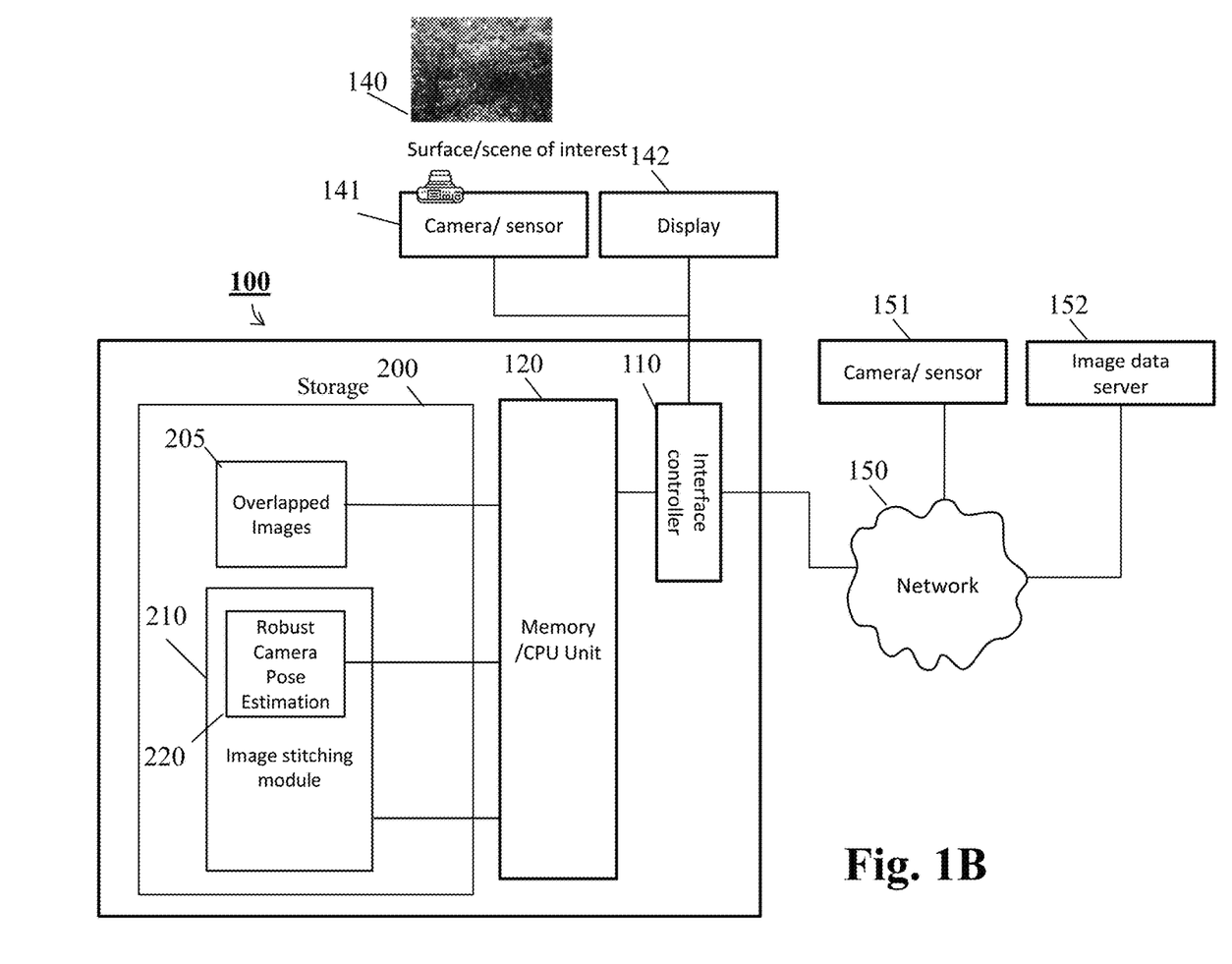
FIG. 1B shows a block diagram illustrating an image processing system, according to embodiments of the present invention.

FIG. 1B shows an example illustrating image collection process, according to embodiments of the present invention. The figure is a schematic diagram illustrating an image stitching system 100 for generating a large image of a surface of interest 140, according to embodiments of the present disclosure.

The image stitching system 100 may include a network interface controller (interface) 110 configured to receive images from a camera/sensor 141 and display 142 images. The camera/sensor 141 is configured to take overlapped images of the surface of interest 140.

Further, the image stitching system 100 may include a memory/CPU unit 120 to store computer-executable programs in a storage 200. The computer-executable programs/algorithms may include overlapped images 205, an image stitching module 210, which includes a robust camera pose estimation unit. The computer-executable programs are configured to connect with the memory/CPU unit 120 that accesses the storage 200 to load the computer-executable programs.

Further, the Memory/CPU unit 120 is configured to receive images (data) from the camera/sensor 151 or an image data server 152 via a network 150 and perform the displacement measurement 100 discussed above.

Further, the image stitching system 100 may include at least one camera that is arranged to capture images of the surface of interest 140, and the at least one camera may transmit the captured mages to a display device 142 via the interface.

In some cases, the at least one camera may be a high resolution digital optical camera. In this case, the sequentially acquired images of partial areas of the object are captured by the camera, the high resolution digital optical camera.

Figure 2:
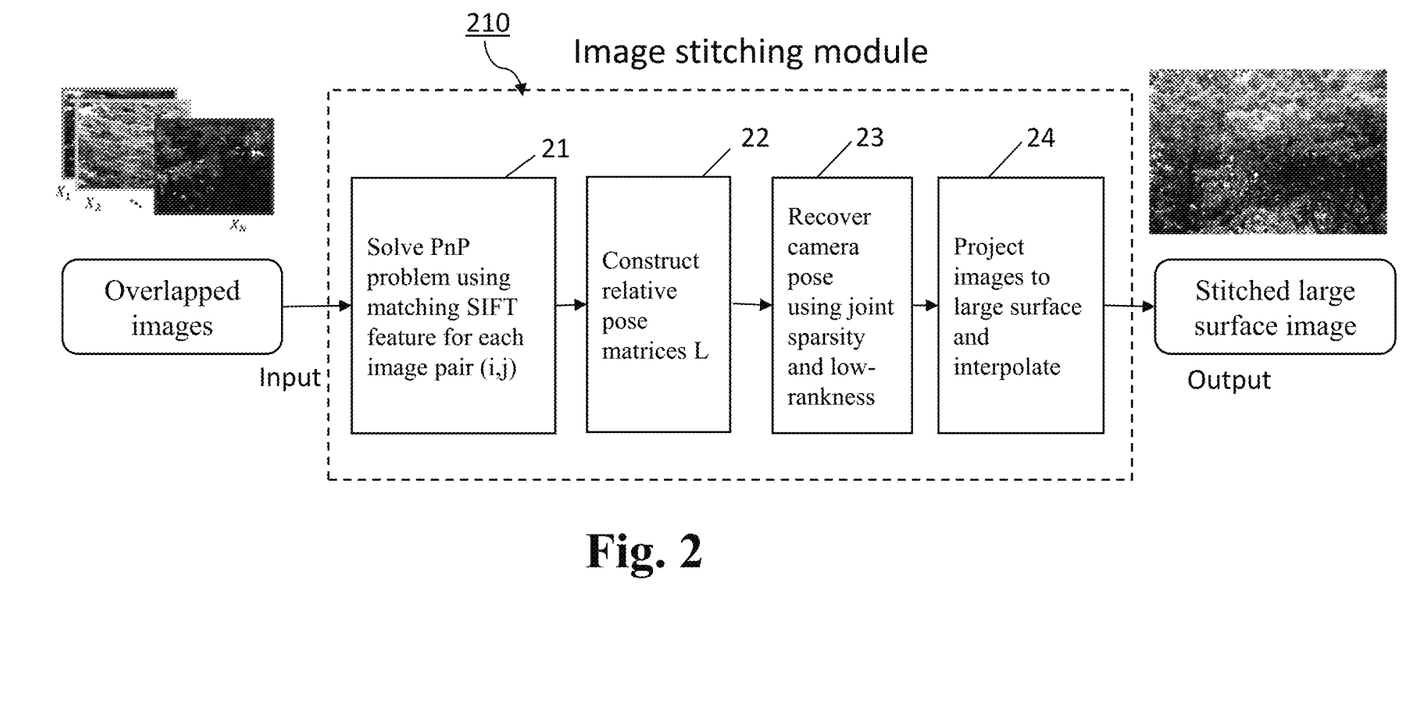
FIG. 2 shows a block diagram illustrating image stitching steps for generating an image of a large surface, according to embodiments of the present invention.

FIG. 2 shows a block diagram illustrating the image stitching module 210 that includes computer-executable programs configured to perform the image stitching steps 21, 22, 23 and 24 for generating an image of a large surface according to embodiments of the present invention. As illustrated, the image stitching steps 21-24 are performed in the image stitching module 210 for generating an image of a large surface. Each image captured by the camera is marked with a serial number. For each pair of images (i-th and j_th image), if they are overlapped (difference of serial numbers will be within a certain range $|i-j|<25$ for example), we seek to calculate the relative camera pose $\hat{L}^{(k)}(i, j)$ of the i-th image relative to the j-th image using a PnP method based on SIFT feature matching points in the overlapped region. If the pair of images are not overlapped, meaning no matching points can be found, the corresponding entry $\tilde{L}^{(k)}(i, j)$ remain missing. We vectorize all observed entries of $\tilde{L}^{(k)}$ as $1^{(k)}=\text{vec}(\{L^{(k)}(i, j)|_{M(i,j)=1}\}) \in \mathbb{R}^{|M|}$ and then form a matrix of relative pose $\tilde{L}=[\tilde{l}^{(1)}, \tilde{l}^{(2)}, \ldots, \tilde{L}^{(K)}] \in \mathbb{R}^{|M| \times K}$ then estimate camera poses by solving an optimization problem that exploiting joint sparsity and low-rankness as $$\min_{S,P} \frac{1}{2} \|(\tilde{L} - AP - S) \cdot W\|_F^2 + \lambda \|S \cdot W\|_{2,1}.$$

With the optimal solution $\hat{P}$, camera poses are recovered by $\hat{p}_n = \hat{P}_{n,:}^T - \hat{P}_{1,:}^T + p_1$, for $n=1, \ldots N$. All images captured by the camera are projected back to the large surface for stitching process using interpolation.

In this work, we target the problem of stitching images of a large 3D surface with known geometry. Without loss of generality, we consider a collection of N images $\{X_n\}_{n=1}^N$ covering a large surface U, for instance a huge painting surface, as illustrated in FIG. 1A. Each image overlaps with it neighbor images for stitching purpose.

We consider a six-degrees-of-freedom (6-DoF) pin-hole camera model in image acquisition. Based on this model, each pixel $(x_c, y_c)$ in image $X_n$ is projected from a point $(x_u, y_u, z_u)$ on the 3D surface U according to $$\begin{bmatrix} x_c \\ y_c \\ 1 \end{bmatrix} = \frac{1}{v} \begin{bmatrix} f & 0 & 0 \\ 0 & f & 0 \\ 0 & 0 & 1 \end{bmatrix} \begin{bmatrix} R & T \\ 0 & 1 \end{bmatrix} \begin{bmatrix} x_u \\ y_u \\ z_u \\ 1 \end{bmatrix}, \quad (1)$$

where $R=R_x(\theta_x)R_y(\theta_y)R_z(\theta_z) \in \mathbb{R}^{3 \times 3}$ is the rotation matrix of three degrees of freedom determined by Euler angles $\theta_x$, $\theta_y$, and $\theta_z$, with $R_x(\cdot)$, $R_y(\cdot)$, and $R_z(\cdot)$ representing the rotation matrix around x, y, and z axes, respectively; $T=[T_x, T_y, T_z]^T \in \mathbb{R}^3$ is the translation vector of translations in x, y, and z directions; $f$ is the focal length of the camera; and $v$ is a pixel-dependent scaling factor to ensure that the projected pixel lies in the focal plane. We note that the pose of the 6-DoF camera is determined by a vector $p=[\theta_x, \theta_y, \theta_z, T_x, T_y, T_z]^T \in \mathbb{R}^K$ with $K=6$ in this specific problem.

For image stitching, an essential task is to estimate camera poses $\{p_n\}_{n=1}^N$ for all images $\{X_n\}_{n=1}^N$ in the collection such that the projective transformation of surface points shown in (1) can be properly compensated. To simplify notations, we concatenate camera pose vectors $\{p_n\}_{n=1}^N$ as row vectors into a matrix P, and define the k-th column (k-th pose parameter) vector of P as $h_k$, i.e., $$P=[p_1, p_2, \ldots, p_N]^T = [h_1, h_2, \ldots, h_K] \in \mathbb{R}^{N \times K}. \quad (2)$$

For the k-th parameter of camera poses, we define a relative camera pose matrix $L^{(k)} \in \mathbb{R}^{N \times N}$ with each entry $$L^{(k)}(i,j) = p_k(k) - p_j(k) = h_k(i) - h_k(j), \text{ for } i,j=1,2, \ldots, N; k=1,2, \ldots, K. \quad (3)$$

where $p_i(k)$ denotes the k-th parameter of $p_i$, and $L^{(k)}(i, j)$, the i-th row and j-th column entry of $L^{(k)}$, represents the k-th parameter of the camera pose associated with image $x_i$ relative to that associated with image $X_j$. We can rewrite the matrix $L^{(k)}$ in the form of vectors as $$L^{(k)} = h_k 1^T - 1 h_k^T \in \mathbb{R}^{N \times N}, \quad (4)$$

where 1 is an N-dimensional vector with all entries equal to 1. It is straightforward to demonstrate that for any non-zero vector $h_k \neq 1$ we have $$\text{rank}(L^{(k)}) = \text{rank}(h_k 1^T) + \text{rank}(1 h_k^T) = 2. \quad (5)$$

Motivated by the aforementioned rank-2 relative camera pose matrices and recent research work of robust low-rank matrix recovery, we aim to recover camera poses from relative camera pose matrices. To this end, we first construct relative camera pose matrices $\tilde{L}^{(k)} \in \mathbb{R}^{N \times N}$ using a traditional PnP method given the collection of images.

For the (i, j)-th entry of $\tilde{L}^{(k)}$, we seek to calculate the relative camera pose of the i-th image relative to the j-th image using a PnP method based on SIFT feature matching points in the overlapped region. For those pairs that are not overlapped, meaning no matching points can be found, their corresponding entries in $\tilde{L}^{(k)}$ remain missing.

Let M be a binary matrix indicating the observability of $\tilde{L}^{(k)}$ entries. $M(i, j)=1$ if $\tilde{L}^{(k)}(i, j)$ is observable, and $M(i, j)=0$ otherwise. Considering camera pose errors caused by false matching points, we model the observed noisy relative pose matrix as $$\tilde{L}^{(k)} = S^{(k)} + L^{(k)}, k=1, \ldots, K, \quad (6)$$

where $S^{(k)} \in \mathbb{R}^{N \times N}$ represents sparse pose estimation errors. To introduce our proposed approach, we vectorize all observed entries of $\tilde{L}^{(k)}$ as $$\tilde{l}^{(k)} = \text{vec}(\{\tilde{L}^{(k)}(i,j)|_{M(i,j)=1}\}) \in \mathbb{R}^{|M|}, \quad (7)$$

In the same element order, similarly we have $$s^{(k)} = \text{vec}(\{S^{(k)}(i,j)|_{M(i,j)=1}\}) \in \mathbb{R}^{|M|}, \quad (8)$$

and $$l^{(k)} = \text{vec}(\{L^{(k)}(i,j)|_{M(i,j)=1}\}) \in \mathbb{R}^{|M|}, \quad (9)$$

Recalling (4), we can express $l^{(k)}$ as $$l^{(k)} = A h_k, \quad (10)$$

where $$A = [\ldots, \alpha_{i,j}, \ldots]^T \in \mathbb{R}^{|M| \times N}, \quad (11)$$

where (i, j) is the index that $M(i, j)=1$ holds. Vector $\alpha_{i,j} \in \mathbb{R}^N$ has all-zero entries except that $\alpha_{i,j}(i)=1$ and $\alpha_{i,j}(j)=-1$. We denote $$\tilde{L} = [\tilde{l}^{(1)}, \tilde{l}^{(2)}, \ldots, \tilde{l}^{(K)}] \in \mathbb{R}^{|M| \times K}, \quad (12)$$

$$S = [s^{(1)}, s^{(2)}, \ldots, s^{(K)}] \in \mathbb{R}^{|M| \times K}, \quad (13)$$

and $$L = [l^{(1)}, l^{(2)}, \ldots, l^{(K)}] = AP \in \mathbb{R}^{|M| \times K}. \quad (14)$$

Considering that different parameters of the camera pose (such as rotation angle $\theta_x$ and transition $T_x$ are of different magnitude ranges, we introduce a weight vector $w=[w_1, w_2, \ldots, w_K]^T$ where $$w_k = \frac{N-1}{\sum_{i=1}^{N-1} |\tilde{L}^{(k)}(i, i+1)|},$$

to normalize the magnitude ranges. Consequently, the camera pose estimation problem is formulated as $$\min_{S,P} \frac{1}{2} \|(\tilde{L} - AP - S) \cdot W\|_F^2 + \lambda \|S \cdot W\|_{2,1}, \quad (15)$$

where $W=\text{diag}\{w\}$ is a diagonal matrix whose diagonal is w, denotes $\|\cdot\|_F$ denotes the Frobenius norm, $\|\cdot\|_{2,1}$ denotes the $\ell_{2,1}$ norm of a matrix defined as $\|Q\|_{2,1}=\Sigma_{i=1}^I \sqrt{\Sigma_{j=1}^J [Q(i,j)]^2}$ for any matrix $Q \in \mathbb{R}^{I \times J}$, and $\lambda$ is the regularization parameter.

Note that (15) is similar to the well-known RPCA in the sense that it decomposes a noisy matrix into a low-rank matrix and a sparse matrix. Nevertheless, here we implicitly impose low-rankness rather than use an explicit low-rank constraint such as nuclear-norm minimization. In addition, we promote joint sparsity across parameters of each pose using the $\ell_{2,1}$ norm. This is based on the observation that when one parameter of a camera pose is not well estimated, all other parameters associated the camera exhibit large errors.

To solve (15), we utilize the alternating minimization method by alternately updating S and P until its stopping criteria is satisfied. The sub-problem with respect to P is a standard least-squares problem, which can be solved by $$P^{(t)}=A^\dagger(\tilde{L}-S^{(t-1)}), \quad (16)$$

where $A^\dagger$ denotes the pseudo-inverse of the matrix A and superscripts (t) and (t−1) represent iteration numbers.

The subproblem of S can be solved by row-dependent soft-thresholding as $$S^{(t)}_{i,:} = (\tilde{L}-AP^{(t)})_{i,:} \odot \max\left(0, 1 - \frac{\lambda}{\left\|(\tilde{L}-AP^{(t)})_{i,:}W\right\|_2}\right), \quad (17)$$

where the subscript (i, :) denotes the i-th row of the corresponding matrix respectively, $\odot$ stands for the element-wise product.

Figure 3:
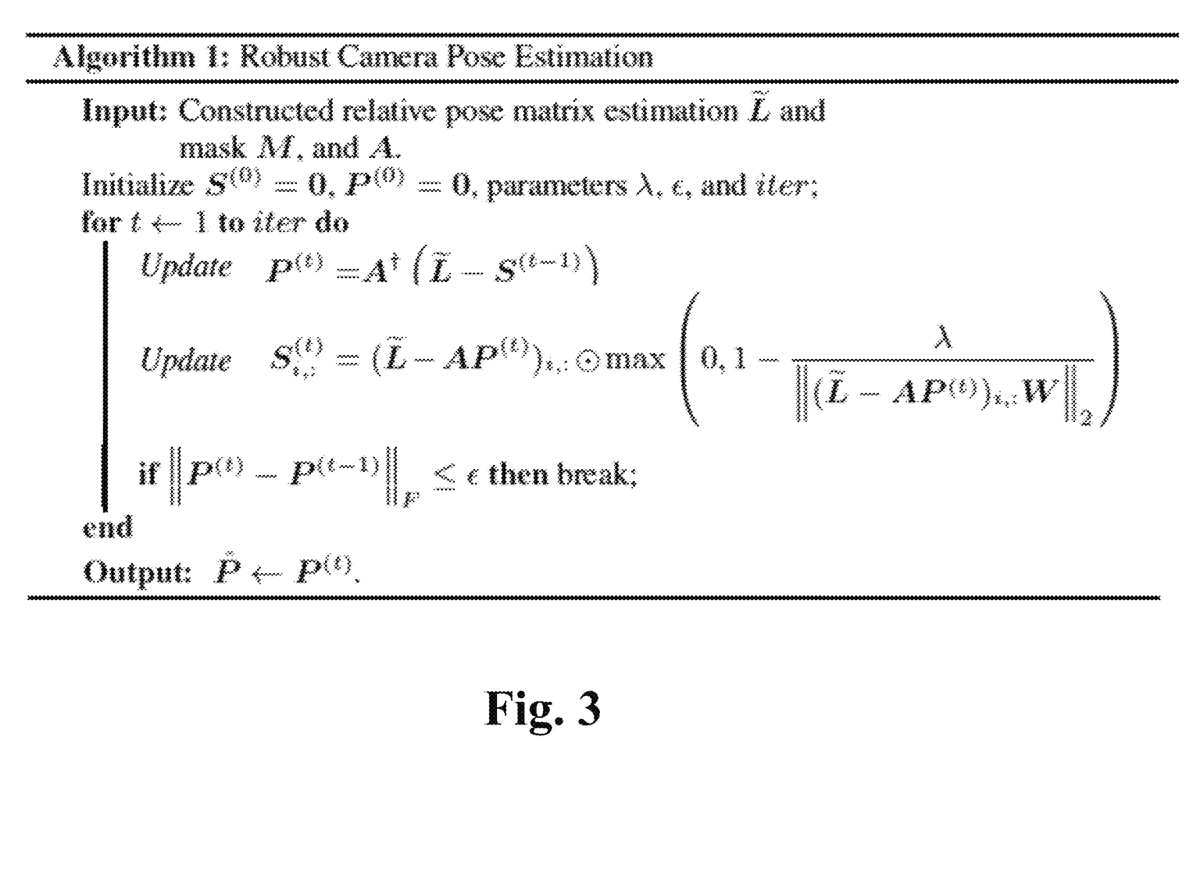
FIG. 3 shows an algorithm describing robust camera pose estimation, according to embodiments of the present invention.

FIG. 3 shows an algorithm describing robust camera pose estimation according to some embodiments of the present invention. The overall solution is summarized in FIG. 3 as Algorithm 1.

We observe that when $\lambda=0$ and $S=0$, Algorithm 1 is reduced to the least-squares method for camera pose estimation $$\hat{P}_{LS}=A^\dagger \tilde{L}. \quad (18)$$

Note that any global rigid translation on camera poses leads to the same relative camera pose matrix L. To avoid ambiguity, we take the first camera pose as a noiseless reference, with other camera poses calculated from the output $\hat{P}$ of FIG. 3 as follows $$\hat{p}_n=\hat{P}_{n,:}^T-\hat{P}_{1,:}^T+p_1, \text{ for } n=1, \ldots N. \quad (19)$$

Once we obtained estimated camera poses $\{p_n\}_{n=1}^N$, we project all N images to the 3D surface U according to (1) to construct the final image using interpolation.

To validate our proposed jointly sparsity and rank-2-based global stitching approach, we simulated a sequence of N=50 images $\{X_n\}_{n=1}^N$ of size 500×600 captured by a camera at different poses using model shown in (1), as illustrated in FIG. 1A. To ensure a full coverage of the whole painting surface U, the camera moves in a snake-scan pattern, capturing overlapped images, and each covers a small portion of the huge painting surface. However, camera poses are perturbed by unknown random disturbance during image collection, and to be estimated in stitching process.

To estimate camera poses, we consider four different methods for comparison: (1) pairwise method, (2) bundle adjustment method, (3) least-squares method, and (4) our proposed method. For the pairwise method, we utilize a SIFT-feature-based perspective-n-point (PnP) method on matching points of the image pair to be stitched with prior knowledge of the 3D scene geometry.

For the bundle adjustment baseline, we expand SIFT-feature matching points by including all those between the target image and its overlapping neighbors. Specifically, when stitching the i-th image, we consider the set of neighbors $\mathcal{G}_i=\{g|g<i, |g-i|\leq 25\}$ for matching points. For the least-squares method and our proposed method, the mask M is given according to the valid number of overlapping neighbors by $$M(i,j) = \begin{cases} 1 & \text{if } |i-j| \leq 25, i \neq j \\ 0 & \text{otherwise.} \end{cases} \quad (20)$$

The hyper-parameter in (15) is tuned as $\lambda=0.01$ for good performance.

Figure 4A:
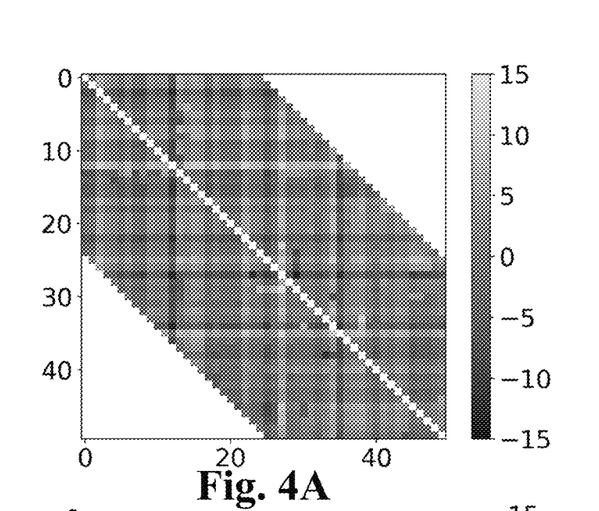
FIGS. 4A, 4B, 4C, and 4D show comparison of example relative camera pose matrix of partial observed using PnP, ground truth, recovered relative pose matrix using least squares method, and recovered relative pose matrix using the robust camera pose estimation, according to embodiments of the present invention.
Figure 4B:
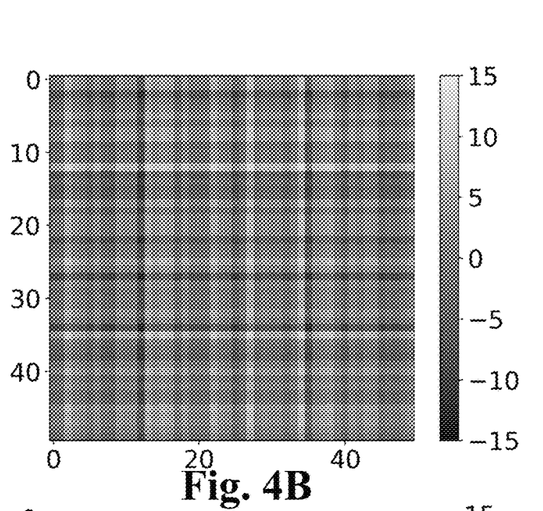
Figure 4C:
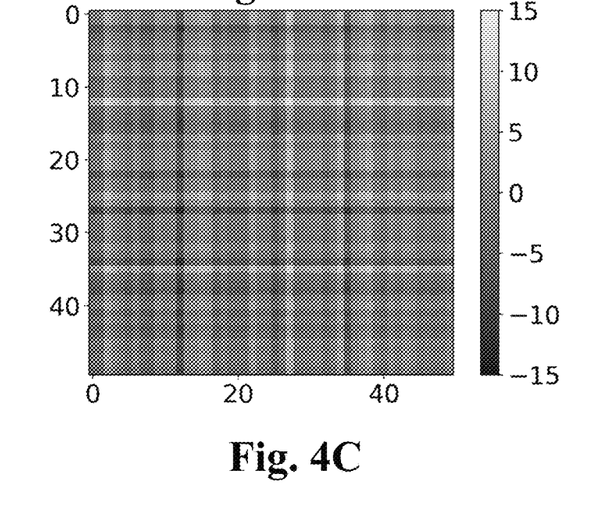
Figure 4D:
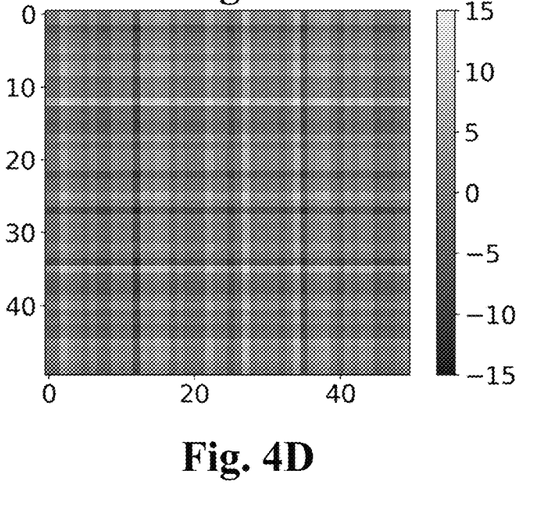

FIGS. 4A, 4B, 4C, and 4D show comparison of example relative camera pose matrix of partial observed using PnP, ground truth, recovered relative pose matrix using least squares method, and recovered relative pose matrix using the robust camera pose estimation according to some embodiments of the present invention. To demonstrate our proposed method in reconstructing the underlying rank-2 matrix using noisy, in FIG. 4A we present one partially observed relative pose matrix $\tilde{L}^{(4)} \in \mathbb{R}^{N \times N}$ as an example, where the white area in the square matrix corresponds missing values. For comparison, in FIG. 4B we show the underlying ground truth matrix $L^{(4)}$ that we desire to recover. Since $L^{(4)}$ is a rank-2 matrix, we can clearly observe similar pattern in rows, and so does that in columns. Furthermore, FIGS. 4C and 4D are the estimated relative pose matrices $\hat{L}^{(4)}$ via the least-squares baseline and our approach respectively. Although both estimates exhibit patterns of low-rankness, the result using our proposed method preserves the true pattern with high fidelity regardless the interference of large relative pose errors.

Figure 5A:
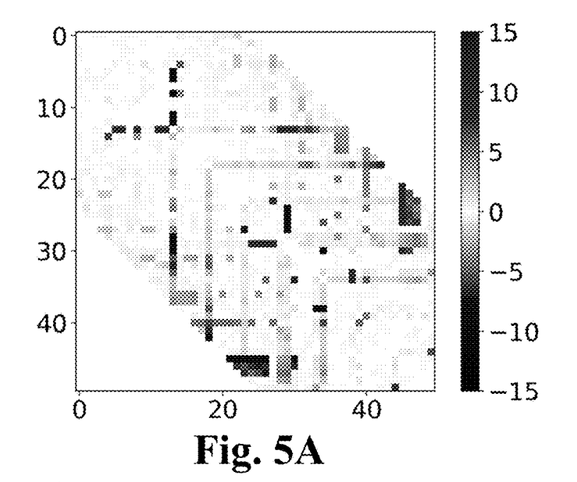
FIGS. 5A, 5B and 5C show comparison of relative camera pose error matrix, according to embodiments of the present invention.
Figure 5B:
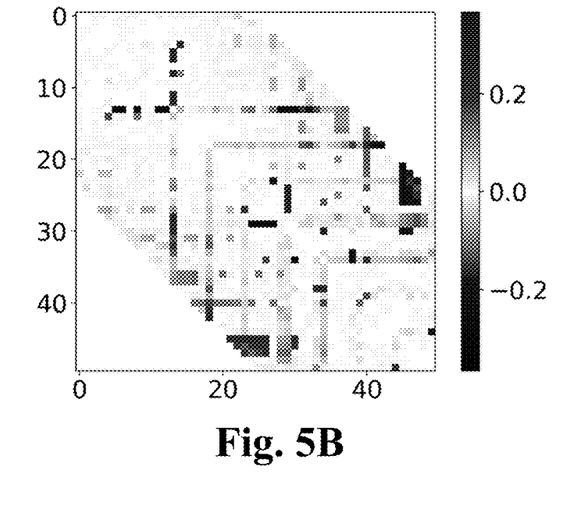
Figure 5C:
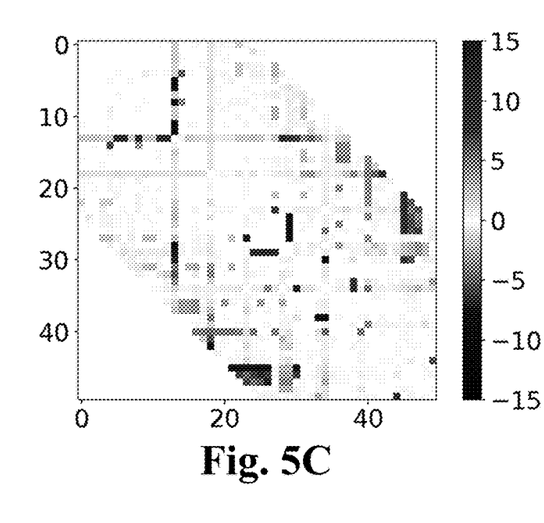

FIGS. 5A, 5B and 5C show comparison of relative camera pose error matrix, according to some embodiments of the present invention. To examine the joint sparsity of pose errors using the PnP method, we present two ground truth noise matrices $S^{(4)}$ and $S^{(3)}$ in FIG. 5A and FIG. 5B, respectively. We observe from these two plots that the supports of sparse errors are consistent in different parameter matrices, which confirmed our model assumption in joint sparsity property of the concatenated error matrix S.

As an example, we show one estimated sparse error matrix $\hat{S}^{(4)}$ in FIG. 5C, which accurately recovered the ground truth $S^{(4)}$ shown in FIG. 5A. It is demonstrated that our proposed approach is robust under abnormal pose errors.

To further quantitatively analyze the performance of our camera pose estimation, we compute the relative estimation error $$e = \frac{1}{K}\sum_{k=1}^K \frac{\left\|l^{(k)}-\hat{l}^{(k)}\right\|_2}{\left\|l^{(k)}\right\|_2}$$

of different methods, where $l^{(k)} \in \mathbb{R}^{|M| \times 1}$ is defined in (9), $\hat{l}^{(k)}$ is the corresponding reconstruction, and $M \in \mathbb{R}^{N \times N}$.

Figure 6:
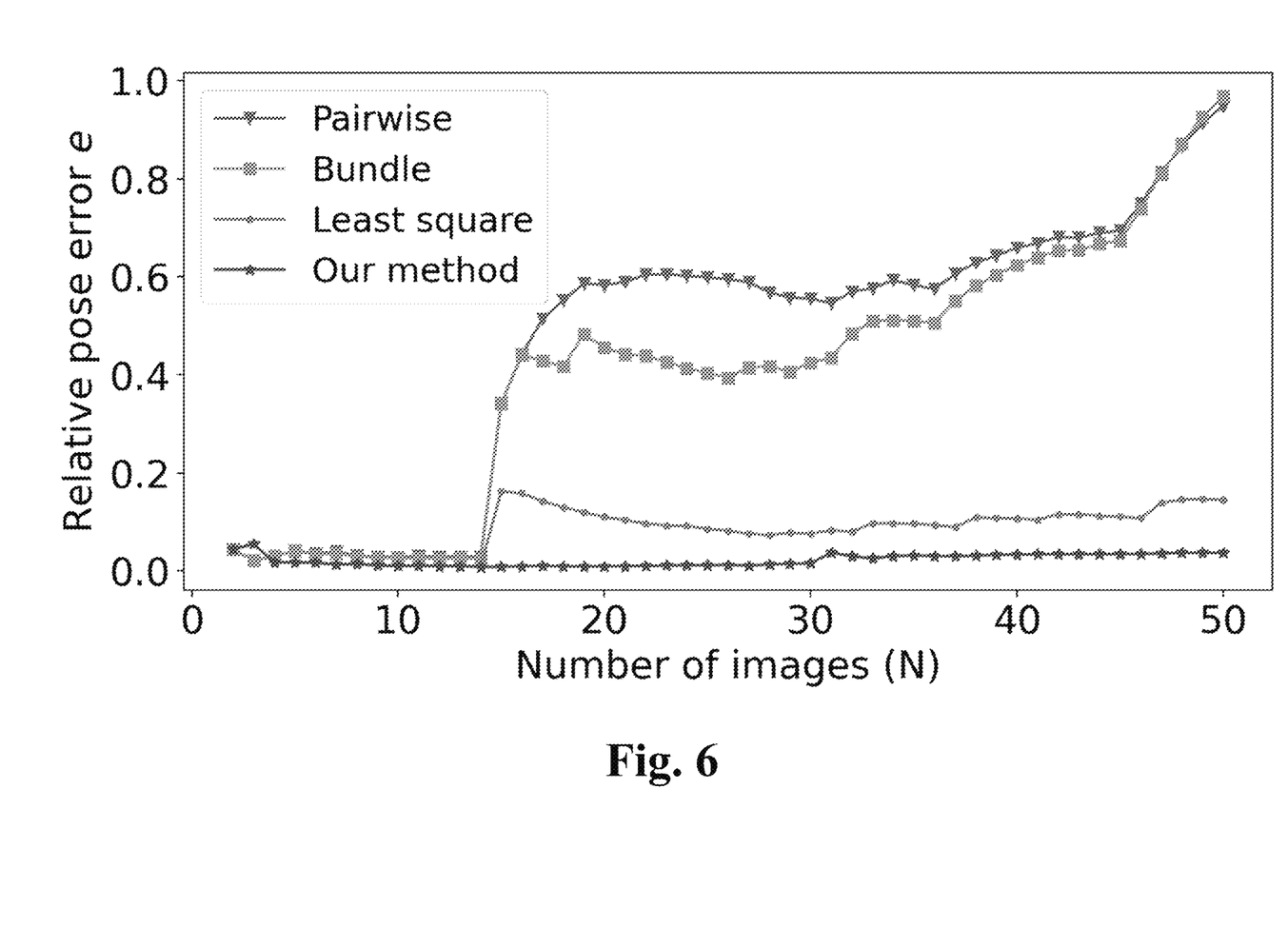
FIG. 6 shows camera pose error with an increasing number of images using different methods, according to embodiments of the present invention.

FIG. 6 shows camera pose error with an increasing number of images using different methods, according to some embodiments of the present invention. The figure plots the relative errors with respect to the number of images N in the figure. We can see that both pairwise and bundle methods show the trend of accumulating camera pose errors with the increase of number of images. While the least-squares method maintains the relative error to a lower level, our proposed method lowers down the error furthermore even under abnormal camera pose errors.

Figure 7:
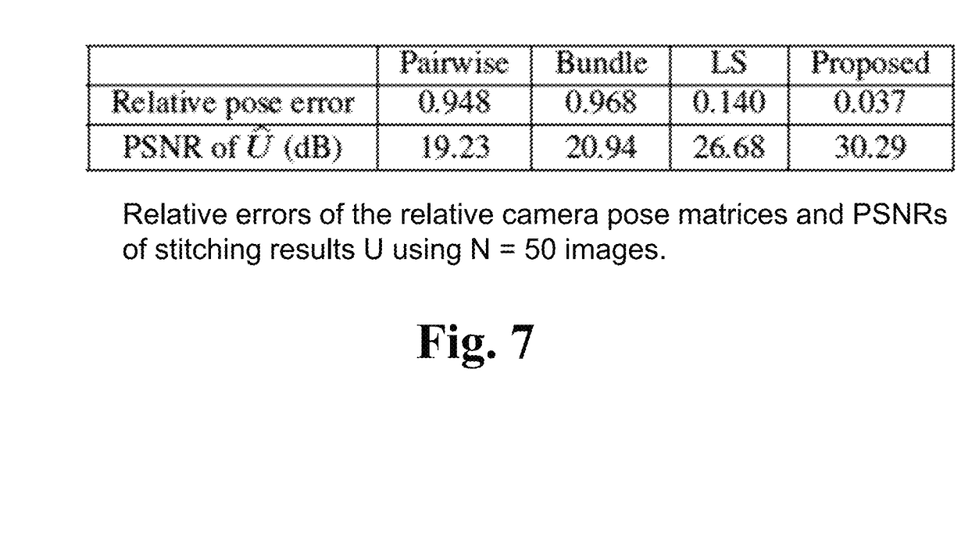
FIG. 7 shows relative errors of camera poses and PSNRs stitched images using different methods, according to embodiments of the present invention.

FIG. 7 shows relative errors of camera poses and PSNRs stitched images using different methods according to some embodiments of the present invention. To evaluate the performance of the different stitching methods, we compute the relative error of relative camera poses and the Peak-Signal-to-Noise Ratios (PSNR) of their stitched images $\hat{U}$, as shown in FIG. 7. From these numbers it is clear that our proposed method performs significantly better than the other three baselines, achieving a much smaller relative error of camera pose estimation and a much larger PSNR of stitched image, by exploiting joint sparsity and low rankness properties.

Figure 8A:
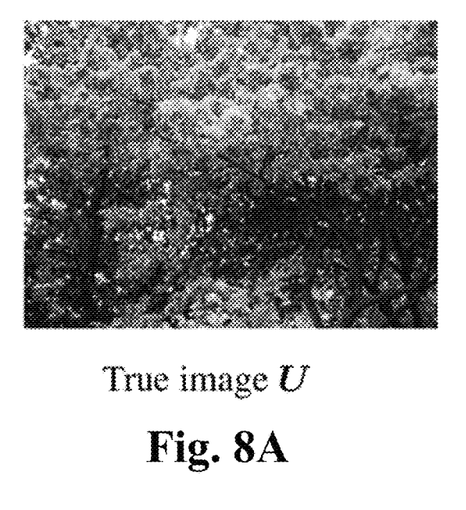
FIGS. 8A, 8B, and 8C show comparison of large surface images of groundtruth, stitched image using the least squares method, and stitched image using the robust camera pose estimation respectively, according to embodiments of the present invention.
Figure 8B:
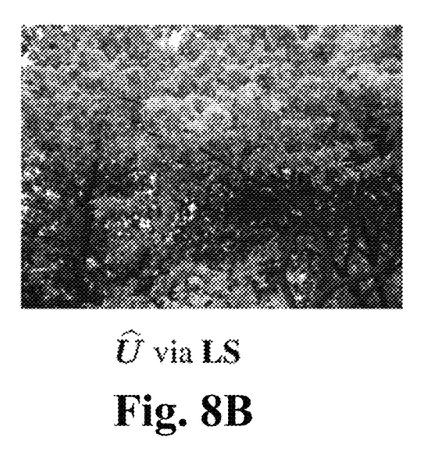
Figure 8C:
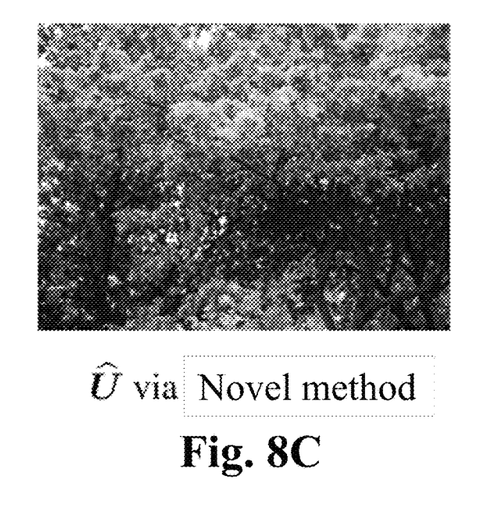
Figure 9A:
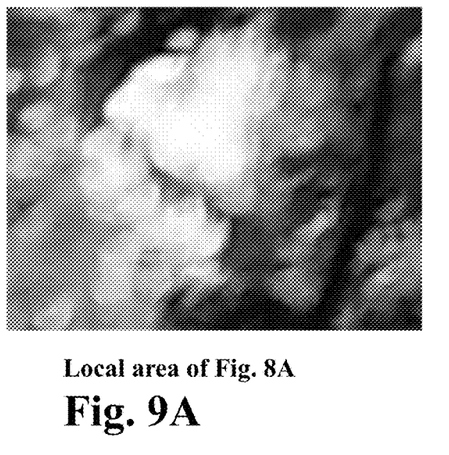
FIGS. 9A, 9B, and 9C show comparison of zoomed-in area images of groundtruth, stitched image using the least squares method, and stitched image using the robust camera pose estimation respectively, according to embodiments of the present invention.
Figure 9B:
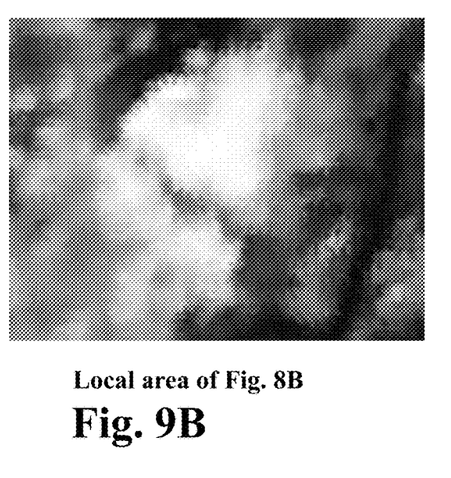
Figure 9C:
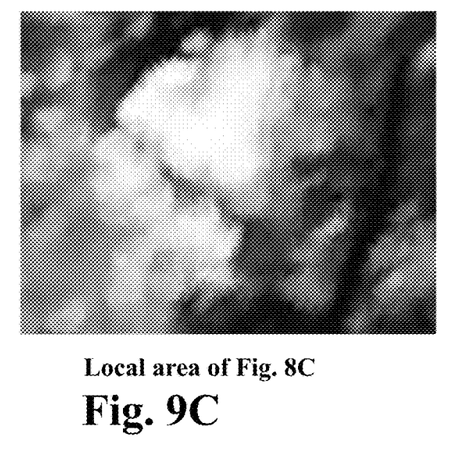

FIGS. 8A, 8B, and 8C show comparison of large surface images of groundtruth, stitched image using the least squares method, and stitched image using the robust camera pose estimation respectively according to some embodiments of the present invention. Using the estimated camera poses, we back project images into the surface $\hat{U}$ and interpolate projected images to get the final image of the large surface. Further, FIGS. 9A, 9B, and 9C show comparison of zoomed-in area images of groundtruth, stitched image using the least squares method, and stitched image using the robust camera pose estimation. In FIGS. 8A, 8B, 8C, 9A, 9B and 9C we show FIG. 8A, the groundtruth image, FIG. 8B, the stitched image using the least-squares method (best baseline), and FIG. 8C, the image using our proposed method for comparison. From FIGS. 8A, 8B, 8C, 9A, 9B and 9C, we can see that both least-squares method and our proposed method achieved good overall visual quality compared to the groundtruth. However, when we zoom in a small area, we observe a lot of artifacts in the stitched image using the least-squares method, as shown in FIG. 9B compared to the groundtruth shown in FIG. 9A. When we use our proposed method, stitching artifacts are significantly reduced, as shown in FIG. 9C. It is clear that our proposed approach outperforms other baseline methods in visual quality.

We proposed a robust camera pose estimation method for stitching a large collection of images of a 3D surface with known geometry. To address the issue of accumulating camera pose error using traditional PnP methods, we constructed a partially observed relative pose matrix for each parameter of camera poses, and decompose it into a rank-2 matrix of relative camera poses and a sparse matrix of camera pose errors by exploiting the joint sparsity of camera pose errors in estimating camera poses. Numerical experiments with images captured by a camera with random poses demonstrate that when abnormal error occurs in camera pose estimation using traditional PnP methods, our proposed method is still capable of detecting and reducing the estimation error, yielding robust camera pose estimation and significantly better stitching results.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The above-described embodiments of the present invention can be implemented using hardware, software, or a combination of hardware and software.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

We claim:

1. An image forming system for constructing a whole image of an object comprising:
   an interface configured to acquire sequential images of partial areas of the object captured by a camera, wherein two images of the sequential images of the partial areas of the object include overlap portions, wherein the sequential images correspond to a three dimensional (3D) surface of the object, wherein geometrical information of the object is provided, wherein an initial pose of the camera is provided;
   a memory configured to store computer-executable programs including a pose estimation method and a stitching method; and
   an image stitching processor configured to perform steps of:
      estimating relative camera poses of each image pair of the sequential images by solving a perspective-n-point (P-n-P) if there is an overlap between the image pair;
      forming i.) a relative camera pose matrix based on the estimated relative camera poses of each image pair and ii.) a sparse pose estimation error matrix based on the relative camera pose matrix;

estimating camera poses with respect to the sequential images based on the estimated relative camera poses by solving an optimization problem that minimizes a term including a Frobenius norm of a difference between the relative camera pose matrix and the sparse pose estimation error matrix;

projecting the sequential images into a 3D surface of the object based on the estimated camera poses with respect to the sequential images;

constructing the whole image of the object as a two-dimensional (2D) image by interpolating the projected sequential images; and outputting the constructed 2D image via the interface.

2. The image forming system of claim 1, wherein the camera is a high resolution digital optical camera.

3. The image forming system of claim 1, wherein the camera is modeled as a six-degree-of-freedom (6-DoF) pin-hole camera.

4. The image forming system of claim 1, wherein each of the camera poses with respect to the sequential images is determined by a three-dimensional Euler angle vector and a three-dimensional translation vector.

5. The image forming system of claim 1, wherein the camera poses with respect to the sequential images are estimated for all images of the sequential images.

6. The image forming system of claim 1, wherein the P-n-P problem uses matching points based on scale-invariant-feature transform (SIFT) features.

7. The image forming system of claim 1, wherein a camera pose of at least a first image of the sequential images is known.

8. The image forming system of claim 1, wherein the image stitching processor is configured to estimate the camera poses with respect to the sequential images using a robust camera pose estimation algorithm which imposes low-rankness and joint sparsity.

9. An image forming method for constructing a whole image of an object, wherein the method comprises steps of:

acquiring sequential images of partial areas of the object captured by a camera via an interface, wherein two images of the sequential images of the partial areas include overlap portions, wherein the sequential images correspond to a three dimensional (3D) surface of the object, wherein geometrical information of the object is provided, wherein an initial pose of the camera is provided;

providing computer-executable programs including a pose estimation method and a stitching method from a memory; and performing, using an image stitching processor, steps including:

estimating relative camera poses of each image pair of the sequential images by solving a perspective-n-point (P-n-P) if there is an overlap between the image pair;

forming i.) a relative camera pose matrix based on the estimated relative camera poses of each image pair and ii.) a sparse pose estimation error matrix based on the relative camera pose matrix;

estimating camera poses with respect to the sequential images based on the estimated relative camera poses by solving an optimization problem that minimizes a term including a Frobenius norm of a difference between the relative camera pose matrix and the sparse pose estimation error matrix;

projecting the sequential images into a 3D surface based on the estimated camera poses with respect to the sequential images;

constructing the whole image of the object as a two-dimensional (2D) image of the object by interpolating the projected sequential images; and outputting the constructed 2D image via the interface.

10. The image forming method of claim 9, wherein the camera is a high resolution digital optical camera.

11. The image forming method of claim 9, wherein the camera is modeled as a six-degree-of-freedom (6-DoF) pin-hole camera.

12. The image forming method of claim 9, wherein each of the camera poses with respect to the sequential images is determined by a three-dimensional Euler angle vector and a three-dimensional translation vector.

13. The image forming method of claim 9, wherein the camera poses with respect to the sequential images are estimated for all images of the sequential images.

14. The image forming method of claim 9, wherein the P-n-P problem uses matching points based on scale-invariant-feature transform (SIFT) features.

15. The image forming method of claim 9, wherein a camera pose of at least a first image of the sequential images is known.

16. The image forming method of claim 9, wherein estimating the camera poses with respect to the sequential images comprises using a robust camera pose estimation algorithm which imposes low-rankness and joint sparsity.

* * * * *